United States Patent Office 3,429,856
Patented Feb. 25, 1969

3,429,856
POLYURETHANES CURED WITH 4,4′-METHYL-
ENE-BIS-(o-TRIFLUOROMETHYLANILINE)
Guenther Kurt Hoeschele, Wilmington, Del., assignor to
E. I. du Pont de Nemours and Company, Wilmington,
Del., a corporation of Delaware
No Drawing. Original application Sept. 14, 1964, Ser. No.
396,349, now Patent No. 3,345,412, dated Oct. 3, 1967.
Divided and this application July 21, 1967, Ser. No.
678,122
U.S. Cl. 260—77.5        1 Claim
Int. Cl. C08g 22/04

ABSTRACT OF THE DISCLOSURE

A polyurethane prepared by reacting (1) an isocyanato-terminated polyurethane prepolymer with (2) a curing amount of 4,4′-methylene-bis-(o-trifluoromethylaniline). The curing agent provides a long pot life and yet reasonable cure time for the castable polyurethane.

---

This application is a division of application Serial No. 396,349 filed Sept. 14, 1964 by Guenther Kurt Hoeschele. This application is now U.S. Patent 3,345,412.

This invention relates to a new chemical compound and its utility as a curing agent for isocyanato-terminated polymers.

There is a growing use of castable polyurethane elastomers for forming mechanical elastomer goods. These polyurethanes are generally formed by first reacting a polyether polyol or a polyester polyol with a molar excess of an organic diisocyanate to form a prepolymer having terminal isocyanato groups. This prepolymer is then mixed with a stoichiometrical equivalent of an organic compound having at least two groups bearing hydrogen atoms reactable with isocyanato groups, and, if desired, a catalyst for the reaction therewith, to form the castable polyurethane. In use, the castable polyurethane is poured into molds and allowed to harden or cure with or without heating. One of the requirements for the castable polyurethane is that it must not set up too quickly or satisfactory moldings cannot be made. In some applications, there is a need to extend the pot life of the castable polyurethane.

It is an object of the present invention to provide a new curing agent for polymers terminated with isocyanato groups, in which the pot life of the resultant castable polymer is extended. A further object of this invention is to provide a new chemical compound. Other objects will appear hereinafter.

The novel compound of the present invention is 4,4′-methylene-bis-(o-trifluoromethylaniline). This compound is a white crystalline solid which melts at 85–87° C. It is insoluble in water and soluble in many organic solvents. It may be distilled without decomposition under vacuum.

The compound is of particular value in the preparation of castable polyurethane compositions; the compound serves as a curing agent which provides a long pot life and yet reasonable cure time for the castable polyurethane. The amount of 4,4′-methylene-bis-(o-trifluoromethylaniline) incorporated in the polyurethane prepolymer can be about an equivalent amount, relative to the terminal isocyanato groups present, or less depending on the particular prepolymer employed and the degree of cure desired.

The specific isocyanato-terminated prepolymers used are not critical to this invention, since the end use of the castable polyurethane governs the composition of the prepolymer. In general, the prepolymers which are pre-dominantly bifunctional, that is possessing two terminal isocyanato groups, have a thermoplastic nature while those with more than two terminal isocyanato groups form cross-linked polyurethanes which are not thermoplastic; both can be cured by the novel compound of the present invention. Examples of such polymers are disclosed in U.S. Pats. Nos. 2,620,516, 2,777,831, 2,843,568, 2,866,-774, 2,900,368, 2,929,800, 2,948,691, 2,948,707, 3,114,-735. Some of these many isocyanato-terminated prepolymers with which this new diamine compound may be reacted are prepolymers made from predominantly linear polyester glycols or polyalkyleneether glycols and aromatic diisocyanates. Others include polythioethers and polyhydrocarbons, both having terminal isocyanate groups. Prepolymers made from polyfunctional compounds such as castor oil and drying oils are also available. These polyfunctional compounds or glycerides are also frequently heated with additional glycerol or other polyol, such as pentaerythritol to introduce additional hydroxyl groups into the composition by trans-esterification before reaction with organic diisocyanates.

The following examples are illustrative of the present invention and therefore are not intended in any way as a limitation on the scope thereof. Parts and percents are by weight unless otherwise indicated.

Example 1

42.1 parts of 35.6% aqueous formaldehyde solution is slowly added to a mixture of 320 parts of water, 117.5 parts of 96% sulfuric acid and 161 parts of o-trifluoromethylaniline while agitating at 30–40° C. (molar ratio of reactants 0.5:1.0). The temperature is gradually raised to 90° C. over a period of 1.5 hours and then the mass held at 90–100° C. for 5 hours while agitating. The mass is then neutralized by adding 275 parts of 36.4% sodium hydroxide solution while agitating. The mass is then allowed to stratify at 90–95° C., and then the aqueous layer is separated and discarded. The semi-solid organic phase is dissolved in 360 parts of ethyl acetate. The resulting solution is then washed with one portion of cold dilute sodium hydroxide and then twice with water. The solution is dried over anhydrous magnesium sulfate. The dried solution is separated and the solvent is distilled off. The crude reaction mass is then subjected to distillation at a pressure of 0.2 mm. of mercury. The 4,4′-methylene-bis-(o-trifluoromethylaniline) is collected as a colorless distillate boiling at 140–145° C. at 0.2 mm. of mercury pressure. The distillate solidifies to a mass of white crystals having a melting point of 85–87° C. Anaylsis shows: C, 53.8%; H, 3.6%; N, 8.2%. Theory for $C_{15}H_{12}F_6N_2$: C, 53.9%; H, 3.62%; N, 8.38%.

Example 2

This example illustrates the use of the new diamine as a chain-extending agent for two isocyanato-terminated prepolymers and compares it with the use of commercially available 4,4-methylene-bis(o-chloroaniline), known as MOCA.

Prepolymer A is made by reacting 1 mol of a polytetramethyleneether glycol of molecular weight 1000 with 1.6 mols of toluene-2,4-diisocyanate. It has a free —NCO content of 4.1%.

Prepolymer B is made by reacting a mixture of 1 mol of polytetramethyleneether glycol and 1 mol of butane-1,3-diol with 4 mols of toluene diisocyanate which is 80% 2,4-isomer and 20% 2,6-isomer. It has a free —NCO content of 9.45%.

The castable polyurethane is formed in all four parts of the example in the same way. The prepolymer is heated in an agitated vessel to 80–100° C. and degassed by applying a vacuum. This is necessary to prevent the formation of bubbles in the casting. The final degassing pressure is 5–10 mm. of mercury. The diamine curing agent is melted and heated to 110–120° C. and added to the hot degassed prepolymer and thoroughly and homogeneously mixed in under vacuum for about one-half minute or slightly longer, depending on pot life. The liquid mixture is then poured into molds which have been preheated to 100° C. The molds are then placed in an air-circulating oven at 100° C. to complete the curing reaction. The proportions of materials used and the properties of the elastomers formed are shown in the table below. The elastomers were aged for 7 days at 50% relative humidity at room temperature before testing.

|  | Parts by Weight | | | |
| --- | --- | --- | --- | --- |
|  | 1 | 2 | 3 | 4 |
| Prepolymer A | 100 | 100 | | |
| Prepolymer B | | | 100 | 100 |
| 4,4'-methylene-bis(o-trifluoro-methylaniline) | 15.7 | | 35.3 | |
| 4,4'-methylene-bis(o-chloro-aniline) | | 12.8 | | 28.2 |
| Tensile strength at break, lbs./sq. in | 3,150 | 3,500 | 6,000 | 5,700 |
| Elongation at break, percent | 480 | 410 | 280 | 140 |
| Modulus, 100% elongation, lbs./sq. in | 940 | 1,100 | 4,790 | 5,000 |
| Hardness, Shore A | 88 | 93 | | |
| Hardness Shore D | | | 75 | 75 |
| Resilience, Rebound, percent | 45 | 49 | 62 | 36 |

The pot life of each of these compositions was determined. The pot life is the length of time the mixture of prepolymer and diamine can be held at casting temperature before it becomes too viscous to cast. The results are shown in the table below.

| Composition (as above) | Temperature, °C. | Pot-life, minutes |
| --- | --- | --- |
| 1 | 100 | 70 |
| 2 | 100 | 12 |
| 3 | 80 | 8 |
| 4 | 80 | 1 |

These comparative results show that the 4,4'-methylene-bis(o-trifluoromethylaniline) reacts with the prepolymers to form an elastomer with properties very similar to those when the conventional diamine, MOCA, is used. However the pot-life is many times longer, thus affording a much greater safety in processing, especially for polymers with a higher —NCO content.

Since the pot-life is so appreciably greater, it follows that longer curing times are required at the same curing temperature when 4,4'-methylene-bis(o-trifluoromethylaniline) is used. The curing time may be shortened, of course, by increasing the temperature.

In another mode of operation, the molten 4,4'-methylene-bis(o-trifluoroaniline) may be added to the isocyanato-terminated polyurethane at room temperature to form a homogeneous solution which has a pot life at ambient temperatures of up to 10–12 hours or longer. This is particularly useful for encapsulation and when large castings are to be made. Shrinkage is less on large castings when the curing is carried out slowly at lower temperatures.

Other polymers terminated with isocyanato groups can be employed as in the foregoing examples and similar results will be obtained.

As many widely different embodiments of this invention may be made without departing from the spirit and scope thereof, it is to be understood that this invention is not limited to the specific embodiments thereof except as defined in the appended claim.

What is claimed is:

1. A polyurethane prepared by reacting (1) an isocyanato-terminated polyurethane prepolymer with (2) a curing amount of 4,4'-methylene-bis-(o-trifluoromethylaniline).

References Cited

UNITED STATES PATENTS

| 2,765,341 | 10/1956 | Wirth et al. | 260—571 |
| 2,929,800 | 3/1960 | Hill | 260—77.5 |
| 3,194,793 | 7/1965 | Kogon | 260—77.5 |
| 3,253,031 | 5/1966 | Powers | 260—570 |
| 3,297,758 | 1/1967 | Hoeschele | 260—570 |
| 3,345,412 | 10/1967 | Hoeschele | 260—570 |

FOREIGN PATENTS 1,371,587   7/1964   France.

OTHER REFERENCES

Sampson et al., "Effect of Amine Structure on the Properties of Cured Polyurethane," Rubber Age, vol. 89, No. 2, May 1961, pages 263–268 relied upon.

"Curalon-L," Bulletin of United States Rubber Co., received in Group 140 on Jan. 30, 1967, Bulletin Number 200-B45, 8 pages cited as being of interest.

DONALD E. CZAJA, *Primary Examiner.*

H. S. COCKERAM, *Assistant Examiner.*

U.S. Cl. X.R.

260—570, 75, 18

UNITED STATES PATENT OFFICE

CERTIFICATE OF CORRECTION

Patent No. 3,429,856　　　　　　　　　　　　February 25, 1969

Guenther Kurt Hoeschele

It is certified that error appears in the above identified patent and that said Letters Patent are hereby corrected as shown below:

Column 3, in the first table, fourth column, line 5 thereof, "6,000" should read -- 6,900 --; same table, fifth column, line 10 thereof, "36" should read -- 56 --.

Signed and sealed this 31st day of March 1970.

(SEAL)

Attest:

Edward M. Fletcher, Jr.

Attesting Officer

WILLIAM E. SCHUYLER, JR.

Commissioner of Patents